US007359992B2

(12) United States Patent
Berthaud et al.

(10) Patent No.: US 7,359,992 B2
(45) Date of Patent: Apr. 15, 2008

(54) METHOD OF PRESERVING SYMMETRICAL ROUTING IN A COMMUNICATION SYSTEM BASED UPON A SERVER FARM

(75) Inventors: Jean-Marc Berthaud, Villeneuve Loubet (FR); Pascal Chauffour, Cagnes sur Mer (FR); Jean-Claude Dispensa, Saint Jeannet (FR); Valerie Mahe, Nice (FR)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 10/317,397

(22) Filed: Dec. 12, 2002

(65) Prior Publication Data
US 2003/0120788 A1 Jun. 26, 2003

(30) Foreign Application Priority Data
Dec. 21, 2001 (EP) .................... 01480134

(51) Int. Cl.
*G06F 15/16* (2006.01)
*H04L 12/28* (2006.01)
(52) U.S. Cl. .............. 709/249; 709/223; 709/224; 709/229; 370/401
(58) Field of Classification Search ............ 709/203, 709/217–219, 223–225, 229, 249, 240; 370/400, 370/401
See application file for complete search history.

(56) References Cited

U.S. PATENT DOCUMENTS 6,173,311 B1 1/2001 Hassett et al. ............ 709/202
6,763,479 B1 * 7/2004 Hebert ........................ 714/4
7,231,462 B2 * 6/2007 Berthaud et al. ........... 709/249
2003/0120816 A1 * 6/2003 Berthaud et al. ........... 709/248
2003/0126268 A1 7/2003 Berthaud et al. ........... 709/229
2003/0131262 A1 * 7/2003 Goddard .................... 713/201
2004/0010583 A1 * 1/2004 Yu et al. .................... 709/224

FOREIGN PATENT DOCUMENTS

EP 1006702 A2 * 6/2000
EP 1 035 708 A1 9/2000

OTHER PUBLICATIONS

Berthaud, J. et al. "Method of Preserving Symmetrical Routing in a Communication System Based upon a Server Farm", IBM Patent Application, Filed concurrently with this application.

* cited by examiner

*Primary Examiner*—LaShonda Jacobs
(74) *Attorney, Agent, or Firm*—Ronald Kaschak; Hoffman, Warnick & D'Alessandro LLC

(57) ABSTRACT

A method of preserving symmetrical routing in a communication system comprising a server farm connected to the Internet through an Internet access router. The server farm includes at least two customer cabinets with at least a WEB server and at least two firewalls. The firewalls use a Virtual Router Redundancy Protocol (VRRP) to set up one firewall as being the primary firewall. The method includes checking in each firewall whether there is a change of the VRRP state from primary to secondary or reciprocally. Such a change indicates that a link between the primary firewall and one of the customer cabinets has failed. The link is disabled from the network to the firewall the state of which has changed from primary to secondary or the link is enabled from the Internet network to the firewall the state of which has changed from secondary to primary.

5 Claims, 2 Drawing Sheets

METHOD OF PRESERVING SYMMETRICAL ROUTING IN A COMMUNICATION SYSTEM BASED UPON A SERVER FARM

TECHNICAL FIELD

The present invention relates to communication systems wherein customer cabinets containing customer WEB severs are hosted in a server farm connected to the Internet network and relates in particular to a method of preserving symmetrical routing in such a communication system.

BACKGROUND

A server farm is a physical location having a scalable infrastructure and facilities and resources enabling users connected to the Internet network to easily access a number of services provided by a plurality of customers hosted by the server farm. Generally, the resources are located in premises owned by a data processing equipment provider such as the IBM Corporation.

Most server farms are used today to host Internet related devices (for example WEB servers) of several customers. The architecture of such a server farm includes a local network to which are connected the customer cabinets and an Internet front-end connecting this local network to the Internet. Such a local network includes different layers of components such as switches and firewalls through which requests from the users connected to the Internet are routed towards the customer cabinets.

The firewalls are intermediary devices between the local Network and the front-end. They are connected by a LAN to an Internet Access Router (IAR) which is directly connected to the Internet.

For redundancy, there are two firewalls connected to the IAR, a primary firewall and a secondary firewall. At a given time, all communications are established through the primary firewall. If the primary firewall fails, the secondary firewall becomes the primary firewall and all the communications pass through it.

The firewalls present all the characteristics of a router with the addition of security filtering features known as firewall rules. A firewall may also have the capability to inspect IP packets and track the state of sessions through the firewall established between two devices separated by the firewall. This capability, which is known as "Statefull Inspection", includes checking that every backward connection is associated with an existing forward connection and following the state of a connection to allow only packets that are in the right sequence level of the connection to proceed. This means that, if a connection is established from an end user to a WEB server (forward path) through a first firewall, all the responses coming from the WEB server to the end user (reverse path) will have to go through this firewall. If any firewall receives a reverse path frame without having received a forward path frame, it will drop the reverse frame. If any firewall receives a data packet while the session is only at the connecting state, it will drop the data packet.

In the local network, a protocol such as the Virtual Route Routing Protocol (VRRP) is used between the firewalls. VRRP allows the customer WEB servers to see the redundant firewalls as a single virtual firewall. At any instant, only one firewall really owns the virtual firewall function based on the availabilities of the firewall interfaces or on static priorities associated with them by configuration. The individual interface having the highest priority is the one elected to own the virtual firewall interface and the associated firewall acts as the virtual firewall until it fails or until another interface with a higher priority appears. A first firewall (called the primary firewall) can own the virtual firewall function for a subset of the customer servers while the other firewall (called the secondary firewall) can own this role for another set of customers. In other words, the first firewall or primary firewall owns the primary interface of the VRRP group of interfaces to each one of these customer servers.

At least two firewalls connect the local network to the Internet network. As a result, there is a routing problem, since the customer WEB servers attached thereto may be reached by at least two different paths going through each firewall. Because of the Statefull Inspection mode in the firewalls, the forward path must be identical to the reverse path, resulting in what is known as symmetrical routing.

One requirement is to allow different customer WEB servers (in different cabinets) to communicate between themselves. This means that all customer servers must have the same primary firewall by configuration in order to provide the symmetrical routing. In case of firewall failover, all the customer servers must be switched over the secondary firewall.

Also by configuration, the firewalls are setup so that a first firewall, which is the primary firewall for all the customer servers, is chosen by default as the firewall to be used by the IAR when both firewalls are operational.

But there is a problem when a link between the first firewall which is the primary firewall being used and the customer WEB servers fails. In such a case, all the frames from the customer servers go through a second firewall. However, the IAR will keep selecting the first firewall as the path to route the frames from the Internet to the customer servers. Therefore, symmetric routing is not preserved, as the forward path for the customer servers is through a firewall whereas the reverse path is through the other firewall. This results in dropping all reverse path frames by the latter firewall.

SUMMARY

Accordingly, an object of the invention is to achieve a method of preserving symmetrical routing in a communication system including a server farm connected to the Internet by the intermediary of at least two redundant firewalls when the interface fails between a customer server and the firewall being currently used.

The invention relates therefore to a method of preserving symmetrical routing in a communication system comprising a server farm connected to the Internet network by an Internet front-end including at least an Internet access router, the server farm comprising at least two customer cabinets with each customer cabinet including at least a WEB server and server farm resources enabling users connected to the Internet network to access the WEB servers in the customer cabinets, and at least two firewalls for controlling communication between users and the WEB servers. The firewalls use a Virtual Router Redundancy Protocol (VRRP) or the like to set up as primary firewall the firewall which owns the primary link of the VRRP group of links to at least one customer and through which is established any communication between an Internet user and one of the customer servers. The method, includes checking in each firewall whether there is a change of the VRRP state from primary to secondary or reciprocally meaning that an interface between the primary firewall and one of the customer cabinets has failed and disabling the interface from the network to the firewall the state of which has changed from primary to secondary or enabling the interface from the Internet network to the firewall the state of which has changed from secondary to primary.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION

Figure 1:
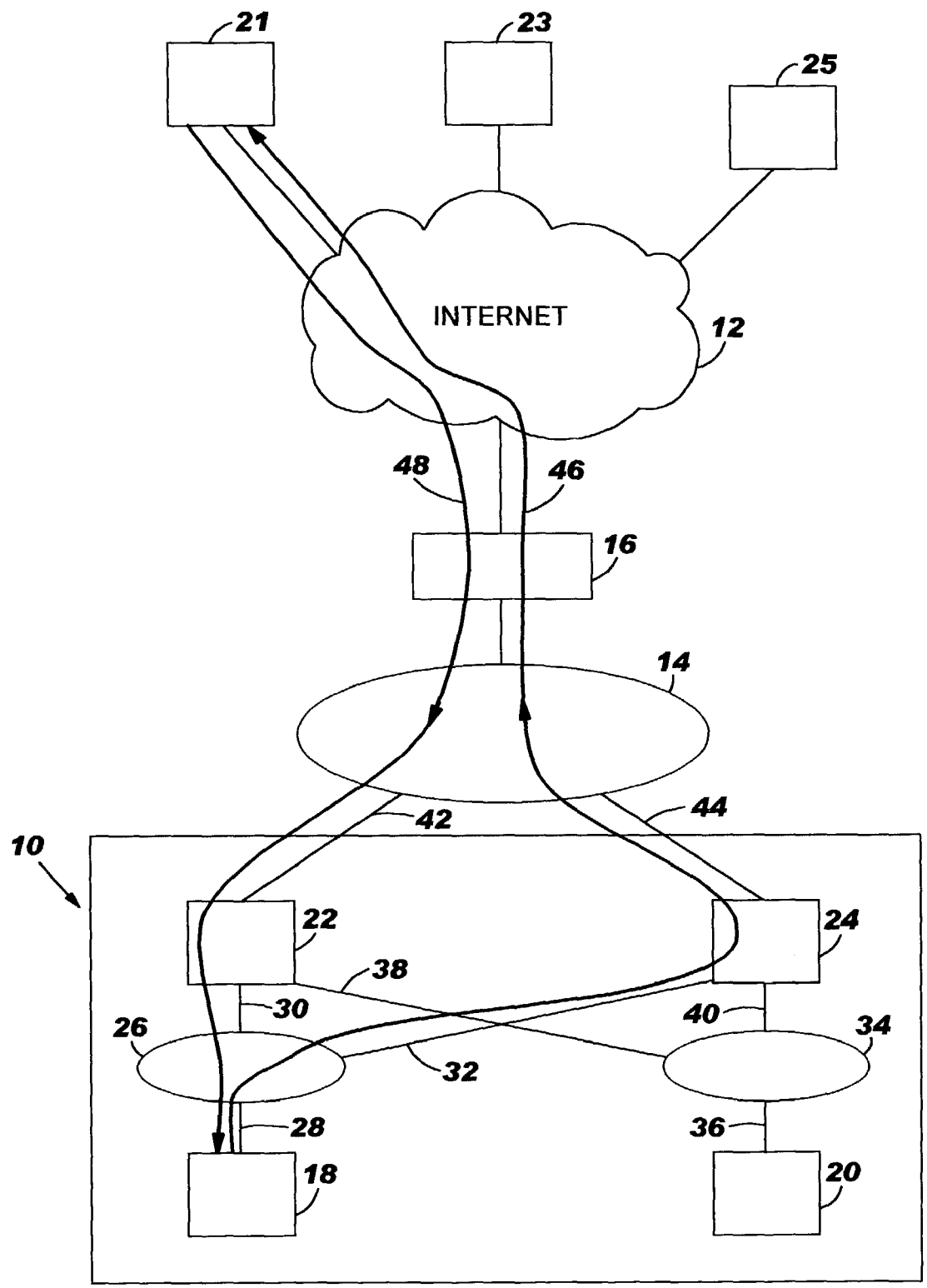
FIG. 1 is a schematic block-diagram representing a server farm wherein the invention can be implemented.

The method according to the invention may be implemented in the context illustrated in FIG. 1 wherein a server farm 10 is connected to the Internet network 12 (or any other Intranet network) by the intermediary of a LAN 14 and an Internet Access Router (IAR) 16. Several customer cabinets such as cabinets 18 and 20 are hosted in server farm 10, each cabinet including one or several customer WEB servers. Each customer cabinet is connected to at least two firewalls 22 and 24 by the intermediary of switches. Thus, customer cabinet 18 is physically connected to a switch 26 by a link 28, the switch 26 being physically connected to firewall 22 by a link 30 and to firewall 24 by a link 32. Likewise, customer cabinet 20 is physically connected to a switch 34 by a link 36, the switch 34 being physically connected to firewall 22 by a link 38 and to firewall 24 by a link 40. Finally, firewalls 22 and 24 are physically connected to LAN 14 by respectively links 42 and 44. Note that a plurality of users such as users 21, 23 and 25 can send requests to the customer WEB servers of each cabinet 18 or 20.

In the communication system illustrated in FIG. 1, the customer servers included in cabinets 18 and 20 may be reached by two different paths going through each of the firewalls 22 and 24. Thus, cabinet 18 can be reached from the LAN 14 through links 42, 30 and 28 or through links 44, 40 and 36. Because of the Statefull Inspection mode in the firewalls, however, the forward path must be identical to the reverse path in order to provide symmetrical routing. Therefore, the two paths may not be used for the forward path and the reverse path.

As already mentioned, one requirement is that a customer server can establish a connection with another customer server, that is a connection between cabinets 18 and 20 in the present case.

Assuming that firewall 22 is the primary firewall for customer cabinet 18, customer cabinet 18 will use firewall 22 in the VRRP sense to initiate a request to connect to cabinet 20. Therefore, the request will flow along the links 28, 30, 38 and 36 to reach cabinet 20 (forward path). For the response to this request, and if firewall 24 is the primary firewall for customer cabinet 20, the reverse path will flow along the links 36, 40, 32 and 28. Because of the Statefull Inspection, this response will be dropped by firewall 24. For this reason all customer cabinets must have the same primary firewall in order to communicate between themselves. In case of firewall failover, all the cabinets will be switched over the secondary firewall, which then becomes the primary firewall for all the customer cabinets after detection of the failure by the internal mechanism of VRRP.

At startup time, and since the initial configuration has setup firewall 22 as the primary firewall, firewall 22 must be used also for both forward path and reverse path by Internet Access Router (IAR) 16. Such a configuration is known by the IAR 16 thanks to a routing table which is setup as follows:

| Link | Next hop | Weight |
| --- | --- | --- |
| Cabinet 18 | Firewall 22 | 1 |
|  | Firewall 24 | 10 |
| Cobinet 20 | Firewall 22 | 1 |
|  | Firewall 24 | 10 |

The firewall to be used for each cabinet is the one having the lowest weight.

In case of failure of link 42 between firewall 22 and LAN 14, the IAR will now select firewall 24 to route the messages. At the same time, as VRRP tracks all the interfaces, firewall 24 will become active from a VRRP point of view. Symmetric routing is therefore preserved, as both forward and reverse paths now use firewall 24.

In case of failure of link 38 between firewall 22 and switch 34, as VRRP tracks all the interfaces, firewall 24 becomes active from a VRRP point of view. This means that all the frames from cabinet 18 will go now through firewall 24 as illustrated by path 46 in FIG. 1. At the same time the routing table in the IAR 16 is modified so that a weight "infinite" replaces the preceding weight for firewall 22 as follows:

| Link | Next hop | Weight |
| --- | --- | --- |
| Cabinet 18 | Firewall 22 | 1 |
|  | Firewall 24 | 10 |
| Cabinet 20 | Firewall 22 | Infinite |
|  | Firewall 24 | 10 |

This means that, for cabinet 20, the reverse path will go through firewall 24 since its weight is lower than the weight of firewall 22, in the same way as the forward path as mentioned above. However, the IAR will keep selecting firewall 22 as the path to route the frames of cabinet 18 as illustrated by path 48 in FIG. 1 since the weight of firewall 22 is lower than the weight of firewall 24. Therefore, symmetric routing will not be preserved in such case and all path frames for cabinet 18 will be dropped by firewall 24.

The solution is to force a link failure on the Internet side in case of link failure on the customer cabinet side. In order to preserve symmetric routing, the forward path must be switched over to the new active firewall when the reverse path has been switched over. This is done by developing, in each firewall, a program that monitors the VRRP state of the firewall on a periodic basis.

Figure 2:
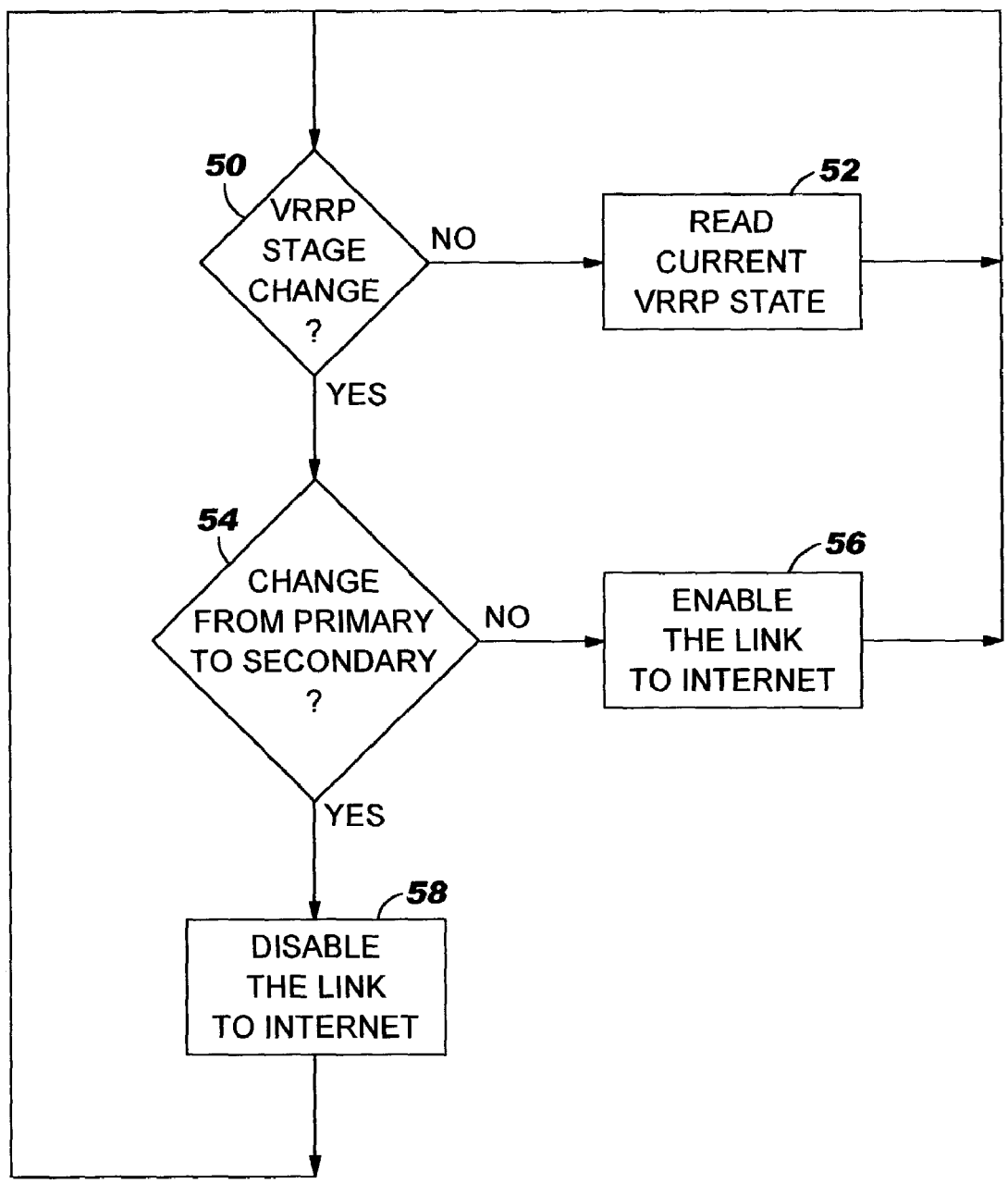
FIG. 2 is a a flow chart representing steps of the method according to the invention.

The steps of the method implemented by the program running in each firewall are represented in FIG. 2. The first step checks whether the VRRP state has changed (step 50). If not, the program reads the current VRRP state (step 52) and returns to check the VRRP state change (step 50). If the VRRP state has changed, it is checked whether the state has changed from the primary state to the secondary state (step 54). If not, the program enables the link to the Internet (step 56) and returns to check the VRRP state change (step 50). If the VRRP state has changed from the secondary state to the primary state, the program disables the link to the Internet network (step 58) and returns to check VRRP state change (step 50).

We claim:

1. A method of preserving symmetrical routing in a communication system said method comprising the steps of:
   providing a server farm connected to an Internet by an Internet front-end including at least an Internet access router, said server farm further comprising:
   a plurality of customer cabinets with each customer cabinet including at least one WEB server and server farm resources enabling users connected to the Internet to access the at least one WEB server in each of the plurality of customer cabinets;
   a plurality of firewalls for controlling communication between users and the at least one WEB server, said plurality of firewalls using Virtual Router Redundancy Protocol (VRRP) to set one of the plurality of firewalls a primary firewall which owns a primary interface of a VRRP group of interfaces to at least one of the plurality of customer cabinets and to establish communication between an Internet user and said at least one WEB server;
   checking in each of said plurality of firewalls whether there is a change of VRRP state from primary to secondary or from secondary to primary; and
   disabling an interface from said Internet to said firewall if the VRRP state has changed from primary to secondary, or enabling an interface from said Internet to said firewall if the VRRP state has changed from secondary to primary.

2. The method according to claim 1, further comprising a step of monitoring whether the VRRP state has changed before the checking step.

3. The method according to claim 2, further comprising a step of reading the VRRP state if the VRRP state has not changed.

4. The method according to claim 1, wherein the server farm resources comprise at least one intermediary switch.

5. The method according to claim 1, wherein the Internet front-end further comprises a LAN.

* * * * *